March 31, 1964   W. W. REDFIELD ET AL   3,126,926
MEASURING AND DISPENSING DEVICE
Filed Oct. 25, 1961

INVENTORS
William W. Redfield
Claude W. Redfield
BY Fred C. Matheny
ATTORNEY 3,126,926
MEASURING AND DISPENSING DEVICE
William W. Redfield and Claude W. Redfield, both of 22106 116th Ave. SE., Kent, Wash.
Filed Oct. 25, 1961, Ser. No. 147,565
2 Claims. (Cl. 141—322)

This invention relates to a measuring and dispensing device for use with a receptacle or package from which finely divided dry material, such as powdered soap or detergent, is to be dispensed.

Objects of this invention are to provide a measuring and dispensing device of simple and inexpensive construction which is well adapted for household use, is easy and convenient to handle, makes possible accurate measuring of dry powdered material; and saves time and trouble in dispensing measured amounts of finely divided dry material from packages.

Other objects are to provide a measuring and dispensing device which is constructed so that it can be suspended within the upper end portion of a receptacle or package containing finely divided dry material, will normally serve as a cover for an opening in the top of said package, can be quickly and easily loaded or charged with a measured amount of the dry material by tilting the package, and can be quickly and easily removed for emptying.

Other objects of this invention will be apparent from the following description and accompanying drawings.

In the drawings FIGURE 1 is a perspective view of a sealed and unopened receptacle or package in which this measuring and dispensing device can advantageously be disposed.

Like reference numerals refer to like parts throughout the several views.

Figure 2:
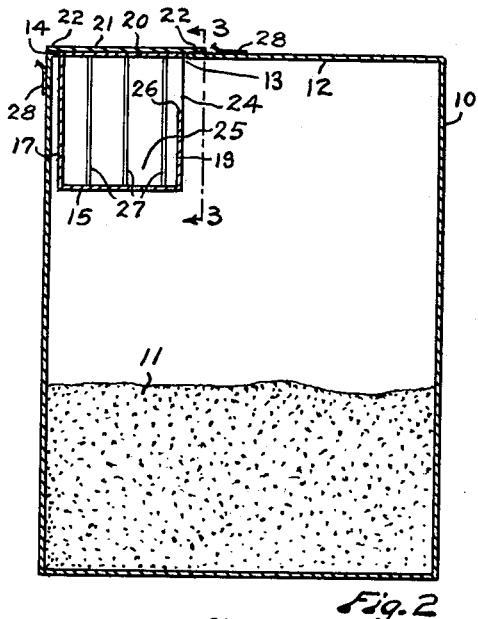
FIG. 2 is a view in cross section of the same, taken substantially on broken line 2—2 of FIG. 1, the package being shown as it may appear after being opened and having part of the contents removed.

FIGURES 1 to 5 show a rectangular cardboard receptacle or package 10 adapted to have this measuring and dispensing device disposed therein. Said receptacle 10 is adapted to contain powdered dry material, such as soap or detergent, shown by stippling 11 in FIG. 1. The top end wall 12 of the receptacle 10 is provided with a rectangular opening 13 of suitable size and shape to receive this measuring and dispensing device. Preferably narrow flanges 14 extend inwardly from the uppermost parts of the walls of the receptacle 10 around three sides of the opening 13.

The measuring and dispensing device, indicated generally by 9 is of approximately box shape. It comprises a bottom wall 15, four side walls 16, 17, 18 and 19 and a top wall 20. If said measuring device 9 is made of cardboard then preferably a flat top member 21 of larger size than the top wall 20 is adhesively or otherwise fixedly secured to said top wall 20. This top member 21 is large enough and is preferably positioned so that all four edge portions 22 of said top member 21 overhang the walls of the measuring device. Three of these overhanging edge portions 22 are adapted to rest on the flanges 14 and the fourth overhanging edge part is adapted to rest on receptacle top 12 and said flanges 22 serve as closure means for the opening 13 and as means for suspending the measuring device 9 within the receptacle 10 and as finger hold means to facilitate handling the measuring device.

An opening 24 through which material may enter and be discharged from the measuring device 9 is provided in at least one side thereof near the top wall 20. This inlet and discharge opening 24 can be varied in shape and size but is preferably made by cutting away or omitting the upper end portion of the outer wall 19 of the measuring device so that the opening 24 extends entirely to the top wall 20, is fairly wide in a vertical direction and extends entirely across the measuring device 9 in a horizontal direction. The walls 16, 17, 18 and 19 and bottom 15 cooperate in forming a measuring cup 25 in the lower end of the measuring device 9. Material can flow into and out of this measuring cup 25 over the top edge 26 of the shorter wall 19.

If the measuring device is formed of cardboard and then preferably at least the two longer side walls 16 and 18 thereof are reinforced and strengthened to provide greater resistance to crushing. This can be done by adhesively securing spaced apart vertical reinforcing members 27 to the inner surfaces of said side walls 16 and 18. The side wall 17 may be similarly reinforced if desired.

Figure 1:
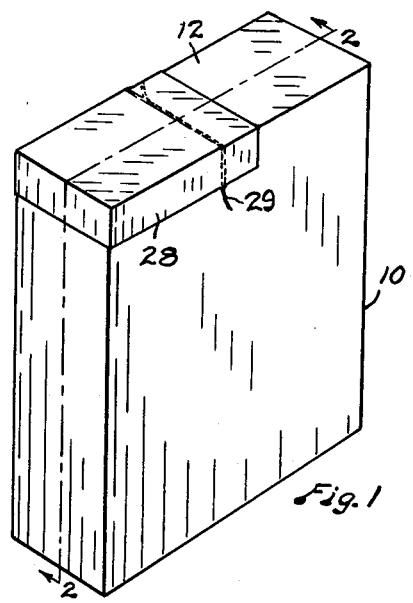
Figure 3:
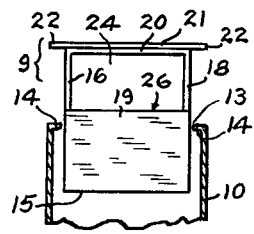
FIG. 3 is a fragmentary sectional view taken substantially on broken line 3—3 of FIG. 2, showing this measuring and dispensing device in elevation and lifted part way out of the receptacle.

The measuring and dispensing device 9, hereinbefore described, can be made of cardboard at a low enough cost so that one of these devices can be installed in each package of detergent or like material at the time the package is filled without substantially increasing the cost of the package. When each package is thus equipped with one of the measuring and dispensing devices then preferably a cap or cover 28 of tough heavy paper or like material is adhesively secured over the top part 21 of the measuring device, as shown in FIG. 1. Also preferably a tear cord 29 is sealed under the cap 28, with one end thereof protruding, so that the cap or cover 28 can be torn by pulling the cord 29. This makes it easier to open the package correctly and so that the measuring device can be used to the best advantage. Obviously other ways of covering the measuring device and sealing it into the package may be devised.

Figure 4:
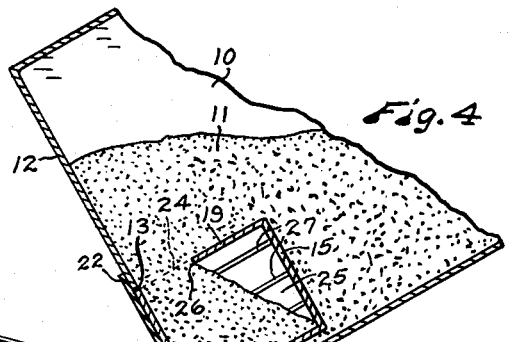
FIG. 4 is a fragmentary sectional view illustrating a preferred manner of filling this measuring and dispensing device by tilting the receptacle in causing the finely divided material to enter the measuring and dispensing device.
Figure 6:
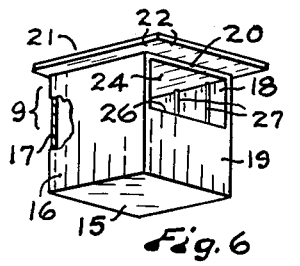
FIG. 6 is a perspective view of the measuring and dispensing device shown in FIGS. 2, 3 and 4, showing the same apart from the receptacle or box with which it is used.

During use of a package of material this measuring and dispensing device is preferably allowed to remain in the package ready for use and to serve as a closure member for the opening 13. To use the measuring device the user holds the same with the overhanging edges 22 of the cover plate 21 pressed snugly against the flanges 14 and top end wall 12 and tilts the receptacle 10, for instance as illustrated in FIG. 4, so that the dry material 11 runs to the top end of the receptacle and enters through the opening 24 and at least partly fills said measuring device. He then tilts the receptacle 10 back into an upright position and causes the material within the measuring device to be caught in the cup 25. Usually more than enough material 11 to fill the cup 25 will enter through opening 24 when package 10 is tilted for filling and when the package or receptacle 10 is returned to an upright position some excess material will discharge back over the top edge 26 into receptacle 10. This insures that a fairly accurately measured amount of material will be retained in the measuring cup at each filling. The filled measuring device can then be lifted out of the receptacle 10 by grasping it by the overhanging edges 22 of the top member 21 and the measured amount of material emptied out of it. Thus the measuring and dispensing device can be quickly and easily filled with an accurately measured amount of material and the filled measuring device can be removed and handled and emptied without spilling the material by inclining and holding it so that the opening 24 is always uppermost.

Figure 7:
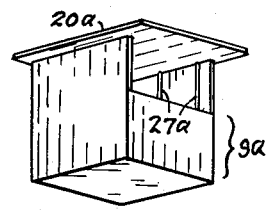
FIG. 7 is a perspective view of a measuring and dispensing device of slightly modified form which can be made of durable material, such as metal or plastic, and is suitable for long-time use.
Figure 5:
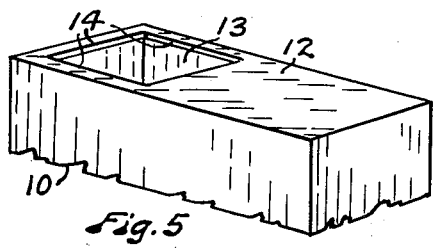
FIG. 5 is a fragmentary perspective view of the top end portion of a receptacle having therein an opening adapted to receive this measuring and dispensing device.
Figure 8:
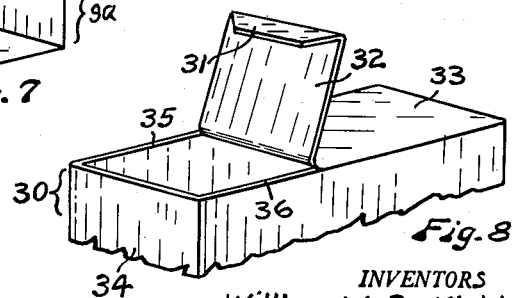
FIG. 8 is a fragmentary perspective view of a cardboard receptacle of different type with which this measuring device can be used.

This measuring device can be made of durable and long lasting material, such as metal or plastic, if so desired. FIG. 7 shows a measuring device 9a made of durable material. This measuring device 9a is similar to the measuring device 9 except that the top wall 20a thereof is formed of a single ply of material and the three longer side walls are secured directly to it. Vertical reinforcing ribs 27a similar to the previously described ribs 27 can be made integral with or rigidly attached to the longer upright walls of the measuring device 9a. Said measuring device 9a is well adapted for long-time use as a household utensil to dispense measured amounts of material, such as powdered soap or detergent, from conventional cardboard receptacles. When this measuring and dispensing device is to be used with an ordinary conventional cardboard receptacle then a top opening, similar to the opening 13, FIG. 5, is formed by cutting a rectangular hole in the cardboard top of the receptacle or by tearing loose a part of the cardboard top of a receptacle along predetermined lines, as illustrated in FIG. 8. Thereafter the use of the measuring device 9a is the same as the previously described use of the measuring device 9.

FIG. 8 illustrates a type of cardboard carton 30 made so that an end tab 31 on a part 32 of the receptacle top 33 can be pulled loose from a side wall 34 to which it is adhesively secured and the part 32 torn back along edges 35 and 36. The receptacle is preferably weakened along edges 35 and 36 to facilitate tearing. The part 32 can be folded up and back so that either the measuring device 9 or 9a can be inserted in the receptacle. When this measuring device is used with the receptacle 30 the overhanging edges of the measuring device rest on the top edge of wall 34 and on the edges 35 and 36 and the part 32 can be folded over and held against the top of the measuring device as a safeguard against leakage while the measuring device is being filled. If desired, the flanges on the top of the measuring device can be wide enough so they will overhang the edges 35 and 36.

The foregoing description and accompanying drawings clearly disclose preferred embodiments of this invention but it will be understood that this disclosure is merely illustrative and that changes may be made within the scope of the following claims.

We claim:

1. In combination, a receptacle for finely divided dry material, said receptacle having a top end wall provided with an opening; a measuring and dispensing device adapted to be removably inserted into said opening in the top wall of said receptacle; and outwardly projecting flat members flush with the top end of said measuring and dispensing device adapted to rest on the top end of said receptacle around the margin of the opening therein and suspend the measuring and dispensing device within said receptacle, said measuring and dispensing device having a material inlet and outlet opening in a side thereof adjacent its top wall and with the lower edge of said material inlet and outlet opening spaced a substantial distance above the bottom of said measuring and dispensing device providing a measuring compartment of predetermined substantial volume in the measuring and dispensing device below the lowermost level of said material inlet and outlet opening.

2. In combination, a rectangular receptacle for finely divided dry material comprising a flat bottom wall and four flat side walls and a flat top wall, said top wall having therein a rectangular opening positioned closely adjacent to three of the side walls and spaced a substantial distance from the fourth side wall of said receptacle; and a rectangular measuring and dispensing device capable of being inserted into and withdrawn from said receptacle through said top opening, said measuring and dispensing device having a top wall of larger size than the opening in the top of said receptacle and capable of closing said opening in said receptacle and suspending said measuring and dispensing device in said receptacle and said measuring and dispensing device having a bottom wall spaced from said top wall thereof and having three side walls extending between its top wall and its bottom wall, said three side walls being disposed in close proximity to side walls of said receptacle when the measuring and dispensing device is within the receptacle, said measuring and dispensing device having a fourth side wall extending from its bottom wall upwardly and terminating in spaced relation from its top wall providing an inlet and outlet opening, the four side walls and bottom wall of said measuring and dispensing device cooperating to form a measuring cup of substantial depth in the lower end portion of said measuring and dispensing device capable of being filled by tilting said receptacle when the measuring and dispensing device is in the receptacle and capable of retaining a measured quantity of material when the receptacle is returned to an upright position.

References Cited in the file of this patent
UNITED STATES PATENTS
2,786,494    Barnby _____ Mar. 26, 1957